March 5, 1929.　　　H. T. GOSS　　　1,704,245
PNEUMATICALLY OPERATED MECHANICAL GEAR SHIFT
Filed March 23, 1928　　3 Sheets-Sheet 1
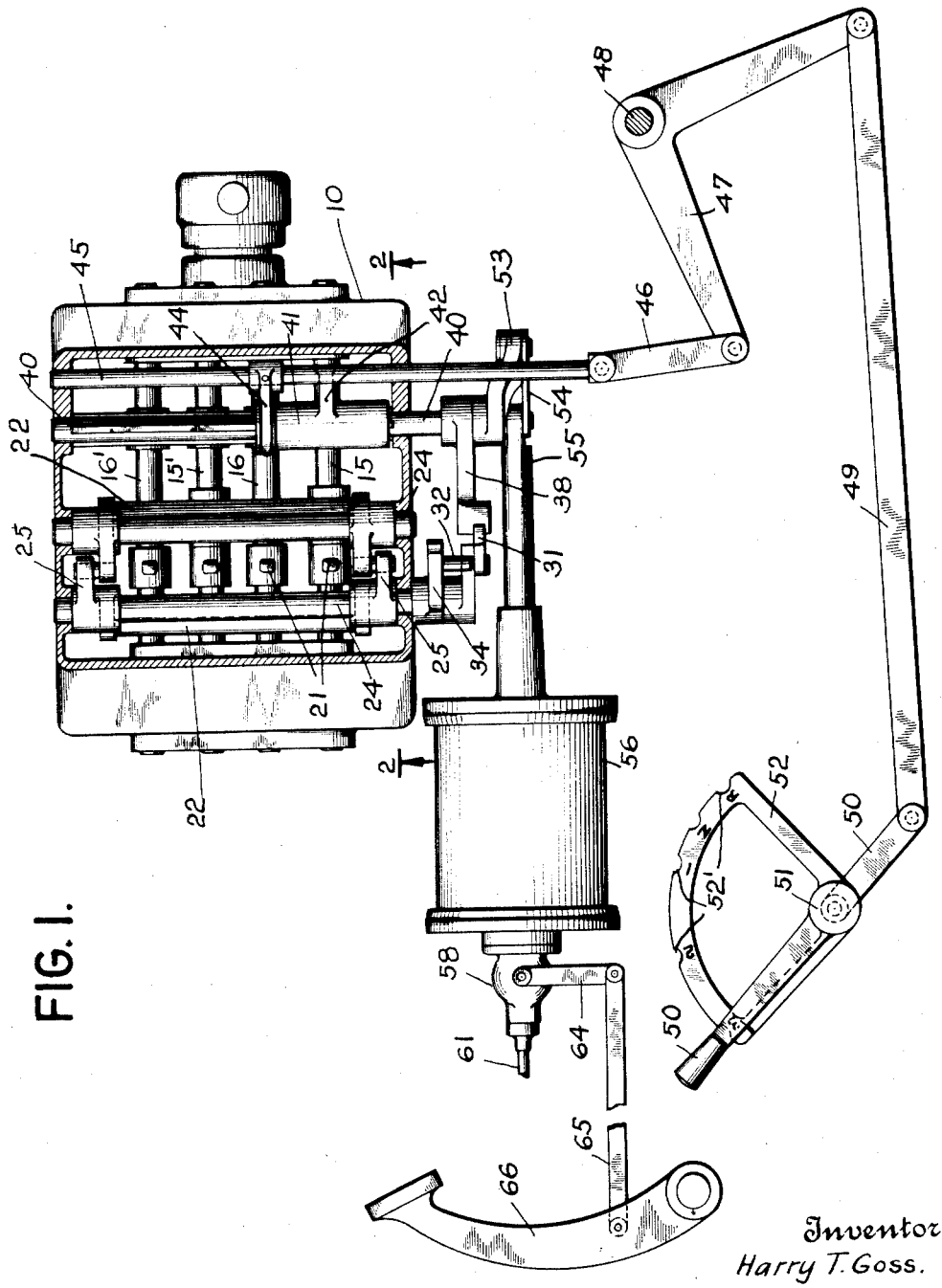
FIG. I.
Inventor
Harry T. Goss.
By his Attorneys
Hoguet & Neary March 5, 1929.   H. T. GOSS   1,704,245
PNEUMATICALLY OPERATED MECHANICAL GEAR SHIFT
Filed March 23, 1928   3 Sheets-Sheet 2
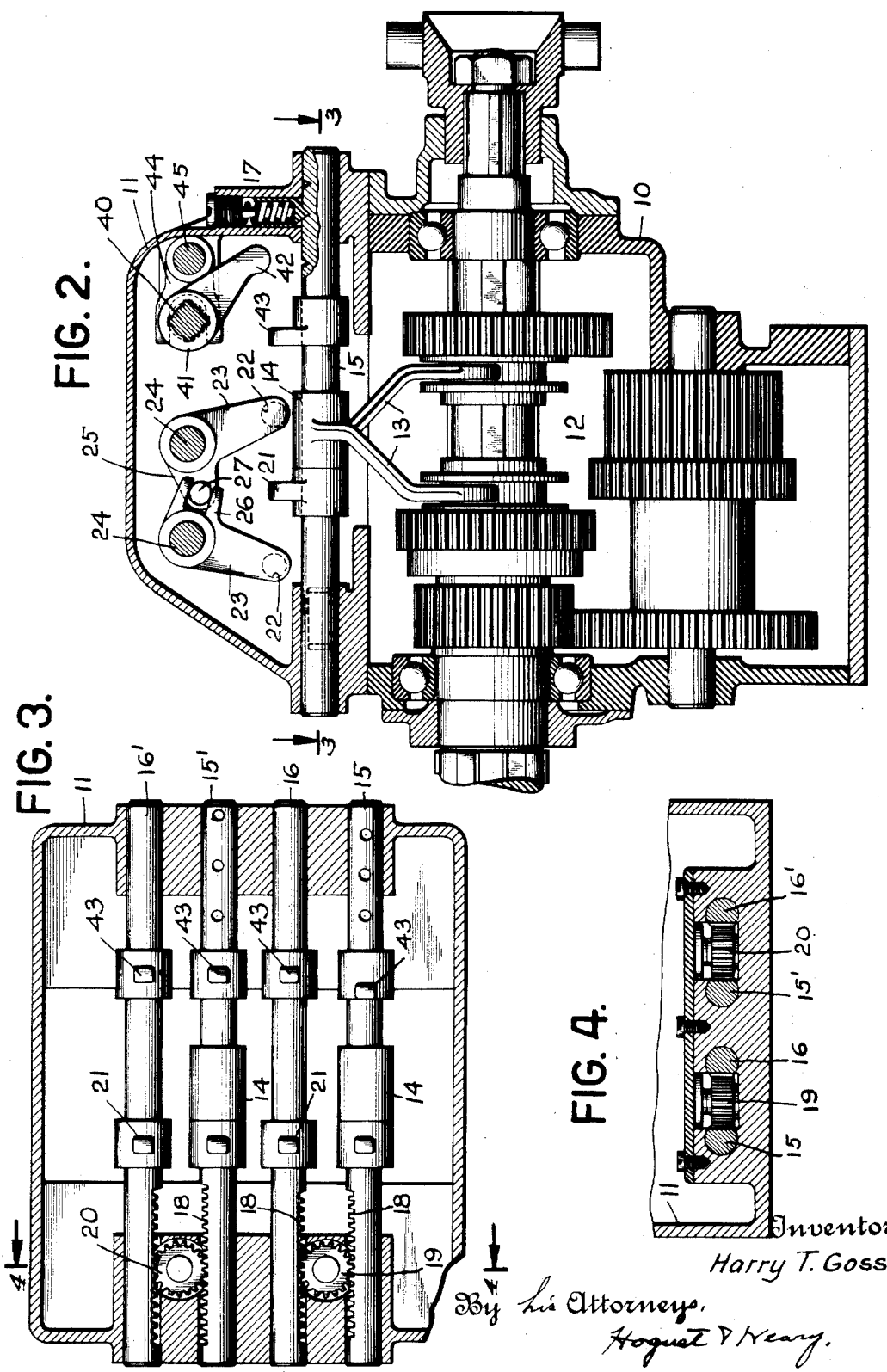
Inventor
Harry T. Goss.
By his Attorneys, March 5, 1929.  H. T. GOSS  1,704,245

PNEUMATICALLY OPERATED MECHANICAL GEAR SHIFT

Filed March 23, 1928  3 Sheets-Sheet 3

Inventor
Harry T. Goss.
By his Attorneys
Hoguet & Neary.

Patented Mar. 5, 1929.

1,704,245

UNITED STATES PATENT OFFICE.

HARRY T. GOSS, OF RUTHERFORD, NEW JERSEY, ASSIGNOR TO UNIVERSAL GEAR SHIFT CORPORATION, OF NEW YORK, N. Y., A CORPORATION OF DELAWARE.

PNEUMATICALLY-OPERATED MECHANICAL GEAR SHIFT.

Application filed March 23, 1928. Serial No. 264,046.

My invention relates to improvements in pneumatic and mechanical gear shifts. The object of my invention is to produce a simple, positive and easily operated structure in which an operating shaft is actuated by a single acting pressure piston and the operating shaft is associated with mechanism for first setting the mechanical gear shift to neutral position, and then mechanically setting the transmission to the desired speed or position. The invention is particularly applicable to motor cars, and another object of the invention is to produce a structure which can be readily applied to any conventional or preferred type of mechanical gear shift. Heretofore pneumatic gear shifts have been used in which pressure pistons act under pneumatic pressure and control to actuate the gear shift parts and to select the particular position and actuate the mechanism to shift the gears. These pneumatic gear shifts are open to the objection that they are rather complicated, and by reason of the complication they are expensive and likely to become disorganized, so as to be unreliable. On the other hand where the gear shifts are operated purely by a manual lever, as for example the clutch lever of a car, they require a good deal of effort on the part of the operator, as the drag of moving the gear shift parts is considerable. The operator finds the duty irksome, tiresome, and furthermore he is likely to make mistakes and sometimes strip his gears. My invention is intended to overcome both of these difficulties. In carrying the invention into effect I use a system of shifting gears which may be conventional or of a preferred type, and also use slip rods in substantially the general way to slide the gears of the gear shift, but in connection with such an arrangement I provide an operating shaft which is rotated or actuated by a single acting piston controlled by a simple valve connected with a lever, as for example the clutch lever of the car. I also provide manually operated selective means for positioning the member on the operating shaft, and then in connection with this selective mechanism provide means for positively and by strictly mechanical, as opposed to pneumatic or other pressure means, for first moving the slip rods and gears to neutral or free position, and then actuating the desired slip rod to shift the gears, so that all the operator has to do is to move the controlling valve so as to apply pressure, preferably suction, to the piston after he has selected the desired position of the gears, and then the further operation is positive and automatic. Thus I avoid the use of the pneumatic system in which a rather intricate valve, numerous ports, and multiple or double acting pistons are used, and I also eliminate the uncertainty and difficulty incident to strictly manually operated gear shifts. All this will be better understood from the following description.

Reference is to be had to the accompanying drawings forming a part of this specification, in which simlar reference characters indicate corresponding parts in all the views.

Figure 1 is a diagrammatic view partly in elevation and partly in sectional plan of the apparatus as a whole.

Figure 2 is a sectional elevation on the line 2—2 of Figure 1.

Figure 3 is a sectional plan on the line 3—3 of Figure 2.

Figure 4 is a detail section of the slip rod mountings on the line 4—4 of Figure 3.

Figure 5:
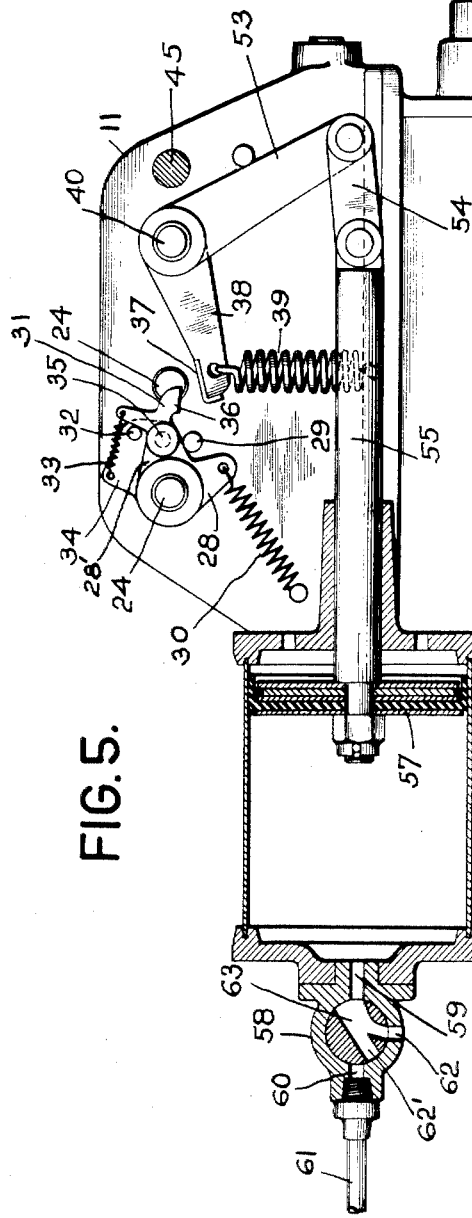
Figure 5 is a broken side elevation with the cylinder and piston in section, showing the connection of the piston with the shifting gears.
Figure 6:
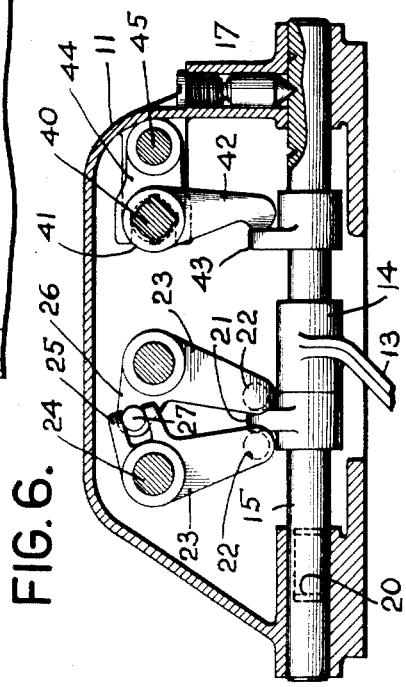
Figure 6 is a cross section through the upper part of the gear case showing some of the operating parts.

The invention has nothing to do with the gearing proper of the gear shift, and this may be of any preferred type. I have shown a rather conventional arrangement in which the gear case 10 has a removable top 11 as usual, and shifting gearing 12, while the gears are shifted in the customary manner by forks 13 connected with collars 14 on the slip rods 15 and 15', while other slip rods 16—16' are paired with the first mentioned slip rods as presently described. Thus the movement of the slip rods shifts the gears in the customary manner. The general arrangement of the slip rods and of the gearing is so common that I will not describe the gearing in detail.

The general arrangement of the slip rods 15—15' and 16—16' is as usual, and they have the customary detent connection shown at 17 with the upper part 11 of the gear case. The opposed faces of the slip rods 15 and 16 and of the slip rods 15' and 16' are provided with toothed racks 18, and the slip rods of each pair connect by pinions or gears 19 and 20 so that when the rod 15 is moved in one direction, the rod 16 will move in the opposite direction, and the same action occurs with the rods 15′ and 16′. Thus a pair of slip rods can have a single actuating mechanism, and each will have an equally positive movement in the desired direction. A pair of rods will thus serve for two movements of the gear shift. Thus if the rod 15′ is moved to the left, it will move the gear shift say to the first position, and if it is moved to the right, it will through the rod 16′ move the gear shift to reverse, and the rods 15 and 16 can be connected with their respective forks so as to actuate the gear shift in a way to move the gear to second or third position.

The several slip rods are provided with abutments 21 (see Figure 3) by which they may be all simultaneously aligned in neutral position so as to leave the gears free, and as will be presently seen the gears are all moved to neutral position before any one can be moved to its desired operating position. To this end the several abutments 21 extend between bails which move back and forth with relation to each other as shown in Figure 2, and comprise the rods 22 and the arms 23 which depend from and are secured to the parallel shafts 24. Thus when the arms 23 open, the rods 22 are moved away from the abutments 21 so as to leave the slip rods all free to move, but when they are moved towards each other they strike the several abutments 21 and move the slip rods all to neutral position. In practice this is precedent to the actual operation of any rod, and the movement will be more fully described below.

The arms 23 are tied together so as to move in unison, and to this end the shafts 24 have arms 25 and 26 which can be parts of the arms 23 (see Figure 2) and which lie side by side. The arm 26 can be bifurcated, and it receives a pin 27 on the arm 25. Thus a positive but free connection is made between the shafts 24 so that they will rotate in unison but oppositely, and the bails comprising the parts 22 and 23 will have a similar movement. One of the shafts 24 is longer than the other (see Figures 1 and 5), and extends through the end of the gear case, where it is provided with a two armed collar 28 and 28′ between which is a limiting pin 29, and the arm 28 is pulled in a direction to open the bails 22 and 23 by a spring 30 (see Figure 5). The shaft 24 carrying the arm 28 is actuated by means of a two armed pawl 31 which in one direction abuts with the limiting pin 32 and is pulled lightly against the pin 32 by the spring 33 which is lighter than the spring 30, and which is attached to an arm 34 on the shaft 24. The pawl 31 is pivoted as shown at 35 on the arm 28′, and its free end 36 extends into the path of the shoe 37 on the arm 38 which is normally pulled down by a strong spring 39 and which is rigid on the operating shaft 40.

The shaft 40 extends through the upper part of the gear case parallel with the shafts 24, and a sleeve 41 is splined securely on the shaft 40 so that it can slide thereon but will turn therewith. The operating shaft 40 has a striking arm 42 which is arranged so as to engage and push any one of the abutments 43 on the slip rods 15—16, 15′—16′.

This sleeve 41 is positioned by a slide rod 45 which moves through the top of the gear case parallel with the shaft 40, and connects therewith by a shipping arm 44. This slide rod 45 is a part of the manually operated selecting means for positioning the mechanism to make a desired movement of the gears, and obviously many devices might be used to adjust it. I have shown the rod 45 connecting by a link 46 (see Figure 1) with a bell crank 47 which is pivoted at its elbow as at 48, and the second arm of which connects by a rod 49 with the lever 50. The latter is pivoted at 51 and moves opposite a conventional quadrant 52 which has notches 52′ therein marked as usual 1, 2, 3, N and R, so that when the lever is moved to one of these notches it will show that the slip rod 45 and sleeve 41 have been moved to the desired position.

The operating shaft 40 is moved by a crank arm 53 and the latter connects by a link 54 with the piston rod 55 which enters the cylinder 56 and connects with the single acting piston 57 therein. The cylinder pressure is controlled by a valve having a casing 58, with a port 59 connecting with the cylinder, a port 60 connecting with a suction pipe 61 which can in turn be connected with an suitable source of vacuum, and the casing 58 has a bleeding or relief port 62. A simple two way valve 62′ controls the flow of pressure fluid. This valve has a port 63 which is shaped so that it may be open to the ports 59 and 62 as shown in Figure 5, or it can be turned so as to close the port 62 and open the ports 60 and 59, thus permitting the cylinder to be exhausted and cause the piston 57 to move in response to the vacuum created in the cylinder. When the port 60 is closed and the port 62 opened, the air enters the cylinder, and the piston is moved back to place by the tension of the spring 39, acting through the arm 38, operating shaft 40 and crank arm 53.

The valve 62′ can be controlled by any suitable lever connection, but the better practice is to connect it with the ordinary clutch lever 66, so that when the clutch of the car is released, the gear shift will be automatically operated. The connection between the valve 62′ and the lever 66 can be by means of a crank arm 64 and rod 65.

The operation of the device is as follows.

When the gear is to be shifted, the lever 50 is moved to the desired notch of the quadrant 52 and the rod 45 is thereby moved endwise so as to bring the sleeve 41 opposite the appropriate slip rod 15, 16, 15' or 16'. The lever 66 is then moved so as to open the ports 59 and 60 and close the port 62, whereupon the piston 57 moves to the outer end of the cylinder (see Figure 5) and moves the crank 53 so as to turn the operating shaft 40 against the tension of the spring 39. The first movement of the shaft causes the arm 38 to strike the pawl 31 and thus turn the shaft 24 with which it connects, and through the medium of the arms 25 and 26 the two shafts 24 will simultaneously turn in a direction to move the bails 22, 23, towards each other, and thus they will strike the abutments 21 and automatically move all the slip rods and the connected gears to free or neutral position. As the movement of the shaft 40 continues, the arm 38 will pass the pawls 31 allowing the spring 30 to pull back on the arm 28 and open the bails 22 and 23, leaving the slip rods all in neutral position but free. As the operating shaft continues to move, the arm 42 on the sleeve 41 will strike the appropriate abutment 43 on one of the slip rods, as the sleeve 41 has been previously moved to bring the arm 42 and abutment 43 into registry. The arm 42 will move the appropriate slip rod, thus actuating and shifting the appropriate gear in the gear casing 10.

It will thus be seen that all the operator has to do is to first manually select the desired position of his gear, then he moves the lever 66, thus admitting pressure to the cylinder 57, and the other operations are absolutely positive and must be accurate. By this simple arrangement the complexity of pneumatic gears and the drag of manually operated gear shifts are avoided.

It will be understood from the description which I have given that the invention is easily applied to most types of mechanical gear shifts, including those that use slip rods as most of them do, and that the details of construction are mostly shown by way of example, and the several mechanical movements might individually be changed to other movements or structures without in the least affecting the invention.

I claim:—

1. In a gear shift of the kind described, the combination with the slip rods and means for operating a desired slip rod, of oppositely swinging members disposed adjacent the slip rods, means operated by the swinging members for moving all the slip rods to neutral position, and means for freeing the slip rods as they reach the neutral position.

2. A gear shift of the kind described comprising a pressure cylinder and a single acting piston therein, a lever controlled valve for the cylinder, a gear shift having shifting gears and slip-rods for moving them, an operating shaft driven from the cylinder piston, a manually adjusted means movable on and turning with the aforesaid shaft and serving to connect the shaft with a desired slip rod, and automatic means acting before the movement of the slip rod by the operating shaft for moving all the slip rods to neutral position.

3. In a gear shift the combination with the shifting gears and the slip rods for moving them, of abutments on the slip rods, oppositely swinging members straddling the abutments and serving to move them all into neutral alignment, means for first operating the aforesaid swinging members and then freeing them and means for operating an individual slip rod.

4. In a gear shift the combination with the shifting gears and their slip rods for moving them, of a pair of oppositely swinging members engaging abutments on the slip rods to move the rods into neutral position, a rotatable power shaft, manually operated means for connecting the power shaft with a particular slip rod, and means actuated by the power shaft for first operating the aforesaid swinging members and then freeing them.

5. In a gear shift the combination with the shifting gears and the slip rods for moving them, of abutments on the slip rods, oppositely swinging members straddling the abutments and serving to move them all into neutral alignment, means for first operating the aforesaid swinging members and then freeing them, said means being further operative, subsequently to shift an individual selected slip rod.

6. A gear shift of the kind described for an automobile, comprising a fluid pressure cylinder and a single acting piston therein, means operative from the manifold of the car to apply a vacuum to said cylinder, a lever controlled valve for the cylinder, a gear shift having shifting gears and slip-rods for moving them, an operating shaft driven from the cylinder piston, a manually adjusted means movable on and turning with the aforesaid shaft and serving to connect the shaft with a desired slip rod, and automatic means acting before the movement of the slip rod by the operating shaft for moving all the slip rods to neutral position.

In testimony whereof, I have signed my name to this specification this 22 day of March, 1928.

HARRY T. GOSS.